United States Patent [19]

Kawanami et al.

[11] Patent Number: 5,408,892
[45] Date of Patent: Apr. 25, 1995

[54] FIRST STAGE RAINFALL SAMPLER

[75] Inventors: Shigeharu Kawanami; Hiroshi Nagai, both of Kyoto, Japan

[73] Assignees: Horiba, Ltd.; Shigeharu Kawanami, both of Kyoto, Japan

[21] Appl. No.: 904,276

[22] Filed: Jun. 25, 1992

[30] Foreign Application Priority Data

Jun. 25, 1991 [JP] Japan .................. 3-181837

[51] Int. Cl.6 ............................................. G01W 1/14
[52] U.S. Cl. .................. 73/364.33; 73/864.31; 73/170.17; 73/170.23; 73/863.56; 73/863.01
[58] Field of Search ........... 73/170.16, 170.17, 863.01, 73/863.02, 863.03, 863.51, 863.52, 863.56, 864.31, 864.33, 170.23

[56] References Cited

U.S. PATENT DOCUMENTS

| | | |
|---|---|---|
| 1,813,834 | 7/1931 | Ballard . |
| 3,127,769 | 4/1964 | Stucky . |
| 3,296,858 | 1/1967 | Doury et al. ............... 73/170.17 |
| 3,958,457 | 5/1976 | Mink . |
| 3,978,723 | 9/1976 | Davis . |
| 4,140,011 | 2/1979 | Krupa et al. ............... 73/170.17 |
| 5,016,196 | 5/1991 | Nelson et al. ............... 73/170.17 |

FOREIGN PATENT DOCUMENTS 2603115  2/1988  France ................. 73/170.17

OTHER PUBLICATIONS

G. S. Raynor et al., "An Automatic Sequential Precipitation Sampler", Atmospheric Environment, vol. 13, No. 1, 1979, pp. 149-155.

C. Ronneau et al., "An Automatic Sequential Rain Sampler", Water, Air and Soil Pollution, No. 9, 1978, pp. 171-176.

An automatic Sequential Rainfall Sampler, by K. D. Hage et al., Review of Scientific Instruments, vol. 45, No. 12, Dec. 1974.

Database WPIL, Week 8322, Derwent Publications Ltd., London, GB AN 83-H4007K & SU-A-945 838, 27 Jul. 1982 (abstract).

Primary Examiner—Hezron E. Williams
Assistant Examiner—Daniel S. Larkin
Attorney, Agent, or Firm—Price, Gess & Ubell

[57] ABSTRACT

A first stage rainfall sampler, which is capable of automatically sampling rainfall step by step without requiring a motive power.

A plurality of sampling containers are swingably and detachably hung down from the circumference of a tumbler which is supported so as to revolve within a vertical plane, at intervals so as to correspond to an outlet port of a funnel in turn. The tumbler is provided with a weight for variably forming a balanced condition between it and rainfall contained by the sampling containers.

14 Claims, 10 Drawing Sheets

FIRST STAGE RAINFALL SAMPLER

BACKGROUND OF THE INVENTION

1. Field of the Invention.

The present invention relates to a first stage rainfall sampler, in particular to a first stage rainfall sampler for sampling a first stage rainfall, such as acid rain, step by step, into a plurality of containers.

2. Description of the Prior Art

Figure 9:
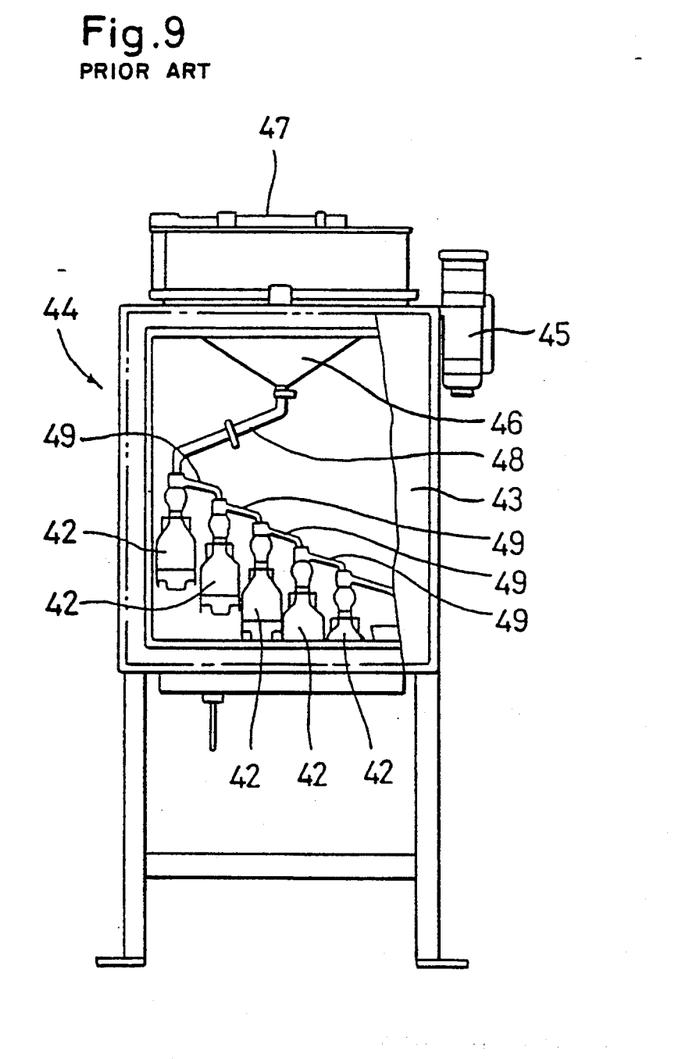
FIG. 9 is a partially cutaway front view showing one example of the conventional sampler.
Figure 10:
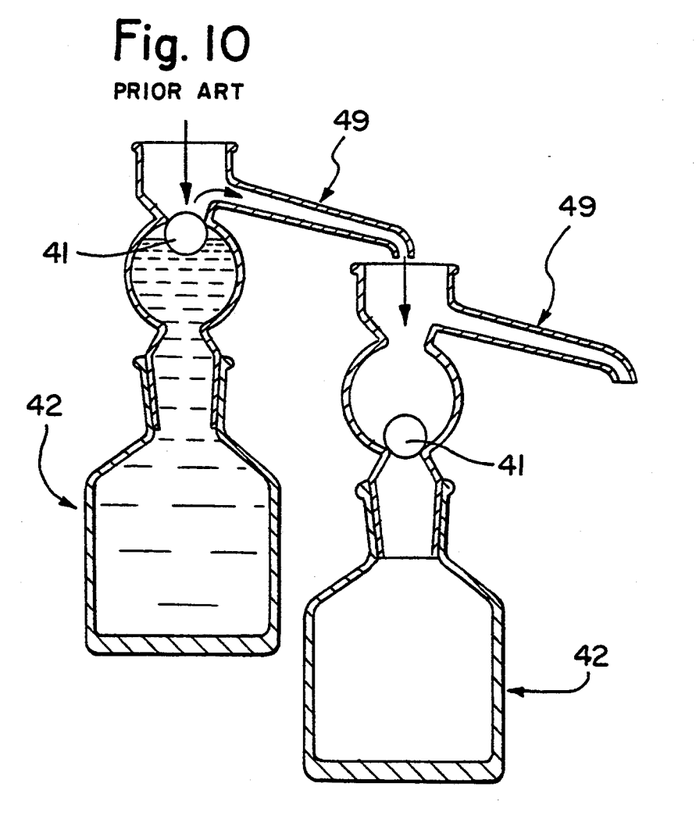
FIG. 10 is a cross-sectional view showing a sampling bottle.

In the case where a rainfall is sampled every 1 mm of rain in a first stage step by step method, a water-sampling bottle 42 provided with a float stopper 41, as shown in for example FIG. 10, has been used. In this case, a sampler 44, in which a plurality of the water-sampling bottles 42 are arranged in a housing portion 43 step by step, as shown in FIG. 9, has been used. In this sampler 44, when the rainfall is detected by a rain sensor 45, a cover member 47 covering a funnel 46 provided in an upper portion of the housing portion 43 is opened to introduce the rainfall at first into a water-sampling bottle 42, which is uppermost arranged, within the housing portion 43, through a conduit 48, and when the water-sampling bottle 42 is filled with the rainfall, the water-sampling bottle 42 is closed by the float stopper 41. The rainfall is then introduced into the next water-sampling bottle 42 by a distributing funnel 49. Subsequently, the rainfall is introduced into the respective following water-sampling bottles 42 in turn step by step.

In the above described sampling method by the use of the water-sampling bottle 42, problems have occurred in that the water-sampling bottle 42 is provided with the float stopper 41 and thus complicated in construction, so that it is not easy to wash the water-sampling bottle 42. In addition, the water-sampling bottle 42 is fixed in volume, so that, in the case where the first stage rainfall is designed to be sampled more finely, for example for every 0.5 mm, the water-sampling bottle 42 or the funnel 46 must be exchanged. In addition, in the case where the first stage rainfall is sampled for every 6 mm or more, the sampler 44 itself is considerably increased in size and weight and thus a high and wide space is required. Thus, for example, selection of an installation site, installation work or transfer and the like are not easy. Furthermore, the cover member 47 of the funnel 46 must be automatically opened and closed by a motor, so that a power source, an additional source of problems, is required.

SUMMARY OF THE INVENTION

The present invention has been achieved taking the above described circumstances into consideration and it is an object of the present invention to inexpensively provide a handy first stage rainfall sampler capable of automatically sampling a first stage rainfall step by step without requiring motive power, which is easy to install and transfer, and easy to wash sampling containers.

In order to achieve the above described object, the present invention has the following construction. An outlet port of a rainfall receiver provided on an openable and closable housing is formed downward within the housing, a tumbler, which is supported by a support member so as to resolve within a vertical plane, is provided within the housing so as to be easily taken in and out of the housing. A plurality of sampling containers are swingably and detachably hung down from the same circumference of the tumbler at intervals so as to correspond to the outlet port in turn, and the tumbler is provided with a weight for variable forming a balanced condition between it and a sampled rainfall.

When rainfall is collected by a rainfall receiver provided on the housing and subsequently poured into a first sampling container drop by drop through the outlet port, a balance between a predetermined weight and the tumbler is changed depending upon the quantity of rainfall poured into the first sampling container drop by drop to revolve the tumbler little by little until the next sampling container lines up with the outlet port to sample the remaining rainfall similarly. A balance condition between the weight and the tumbler is further changed depending upon the quantity of rainfall poured into the next sampling container drop by drop until a further subsequent sampling container corresponds to the outlet port. Subsequently, the balance condition between the quantity of rainfall sampled in the sampling container and the weight is variable changed in turn, whereby an appointed quantity of rainfall is automatically sampled in the respective sampling containers. In short, the rainfall can be automatically sampled step by step without requiring a motive power by the change of balance between the sampled rainfall and the weight in weight.

Such a sampler can be formed of lightweight and compact by making it from, for example, transparent acrylic resin materials and inexpensively provided in the form of an easily carriable and handy design. In addition, the construction that the respective sampling containers are detachably hung down from the tumbler is simple, so that, if the tumbler is taken out of the housing to remove the respective sampling containers, washing and the like can be easily conducted.

DETAILED DESCRIPTION OF THE PREFERRED EMBODIMENTS

The present invention will be described with reference to the preferred embodiments thereof.

A first stage rainfall sampler in the present preferred embodiment can sample about several millimeters of first stage rainfall in seven divided stages and has the following construction.

Figure 1:
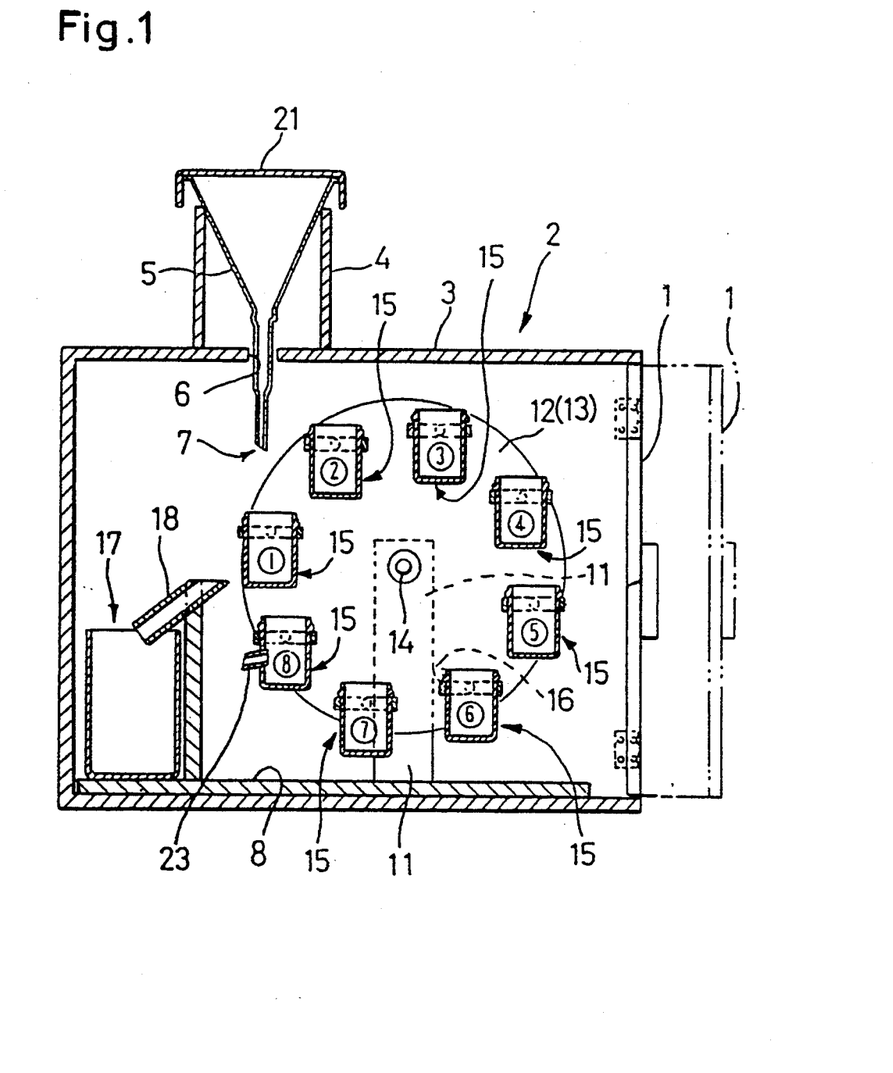
FIG. 1 is a longitudinally cross-sectional front view showing one preferred embodiment of a first stage rainfall sampler according to the present invention.
Figure 2:
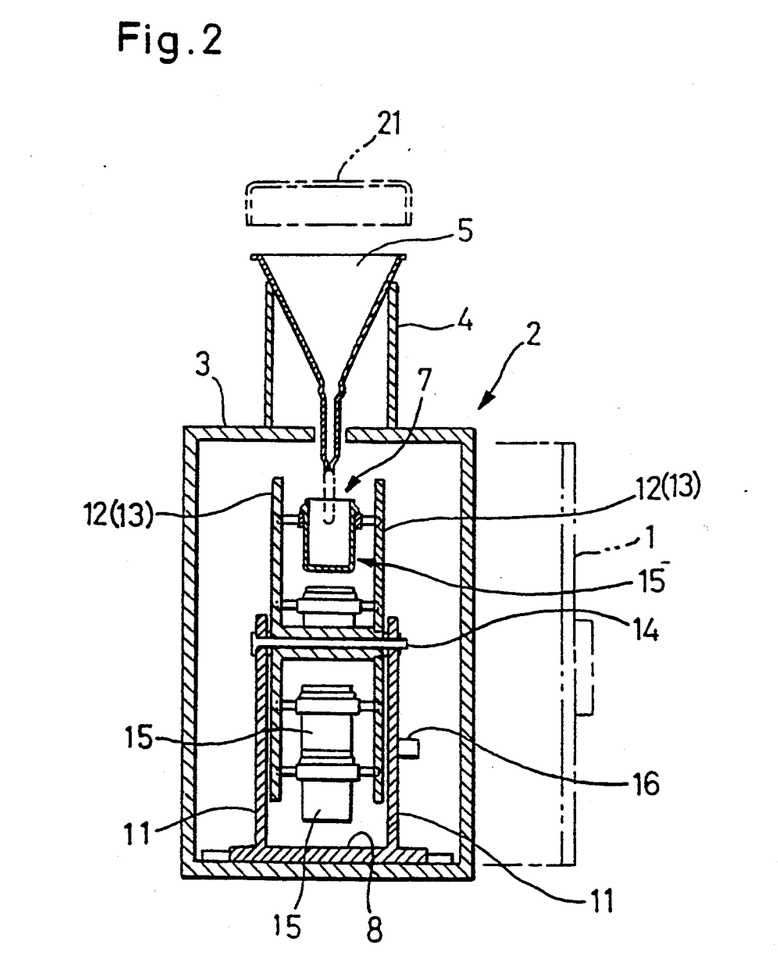
FIG. 2 is a longitudinally cross-sectional side view showing the first stage rainfall sampler.
Figure 3:
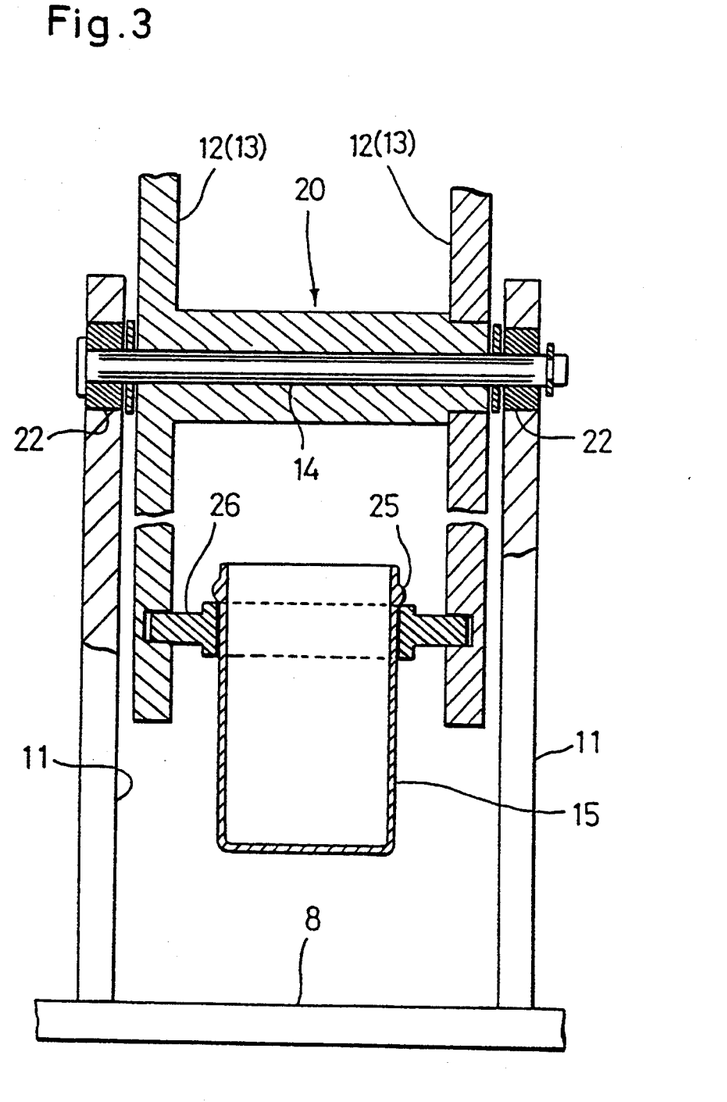
FIG. 3 is a partial cross-sectional view showing the first stage rainfall sampler.

As shown in FIGS. 1 to 3, a transparent box-shaped housing 2 having an opening door 1 on one side thereof is provided with a cylindrical funnel-receiving member 4 fixedly mounted on a ceiling portion 3 thereof. A funnel (rainfall receiver) 5 having a diameter of 8 cm placed on the cylindrical funnel-receiving member 4, and a pointed end portion of the funnel 5 passes through a funnel hole 6 formed in the ceiling portion 3 so that an outlet port 7 may downwardly face an upper portion within the housing 2. A tumbler 13 consisting of a pair of disks 12, 12 revolvably supported by a pair of support members (support plates) 11, 11 standing on a bed plate 8, which can be taken out of the housing 2. The tumbler 13 resides in a vertical plane and is housed in the housing 2. Eight sets of cylindrical bottomed sampling containers 15 are swingably and detachably provided between both disks 12, 12 on the same circumference at regular intervals, and one disk 12 provided with a cylindrical weight fixedly projecting outward on an outer side thereof.

With such a construction, in a first stage, as shown in FIG. 1, a first sampling container 15 ((1)) corresponds to a position immediately under the outlet port 7 of the funnel 5 and a weight 16 is engaged with one side of one support plate 11 with a support shaft 14 of both disks 12, 12 put between the weight 6 and the sampling container 15 ((1)). Although the weight 16 serves also as a first stage position-determining mechanism in the first stage in this preferred embodiment, a first stage position-determining stopper may be provided separately from the weight 16. When it likely to rain, if the funnel 5 is equipped with a removable cover 21, the rainfall is collected by the funnel 5 when it rains, and, the rainfall is first poured into the first sampling container 15 ((1)) drop by drop through the outlet port 7. When the rainfall is sampled in the first sampling container 15 ((1)) and a moment of rotation by the rainfall sampled in the first sampling container 15 ((1)) becomes larger than that acting upon the support plate 11 from the weight 16, a balance in weight between the weight 16 and the rainfall sampled in the first sampling container 15 ((1)) is changed to start a revolution of the disks 12, 12 in the direction shown by an arrow 24 in FIG. 4 (counterclockwise direction in FIG. 1). When the rainfall is gradually accumulated in the first sampling container 15 ((1)) to gradually descend the sampling container 15 ((1)), a second sampling container 15 ((1)) corresponds to the outlet port 7 of the funnel 5 to start a sampling of rainfall similarly. During that time, the weight 15 is separated from one end of the support plate 11 to be raised while forming a balanced condition between it and the rainfall sampled momentarily. When an appointed quantity of rainfall is sampled in the second sampling container 15 ((2)), a third sampling container 15 ((3)) corresponds to the outlet port 7. Subsequently, an almost equal quantity of rainfall is sampled in the third sampling container 15 ((3)) and the following sampling containers 15 until a seventh sampling container 15 ((7)) is in turn, similarly positioned. In addition, the first sampling container 15 ((1)) does not move during an initial short time when the weight 16 is engaged with the support plate 11, as above described, so that there is a tendency that the quantity of rainfall sampled in the first sampling container 15 ((1)) is larger than that sampled in the second to seventh sampling containers, respectively, but this tendency can be reduced by for example regulating a position of a bed plate 8 or adding to the weight to regulate the first sampling container 15 ((1)) in weight.

When the appointed quantity of rainfall is sampled in the seventh sampling container 15 ((7)) and the following eighth sampling container 15 ((8)) corresponds to the outlet port 7 of the funnel 5, the weight 16 is engaged with the other side of the support plate 11 to stop the disks 12, 12. At this time, the eighth sampling container 15 ((8)) is arranged immediately below the outlet port 7 and a pointed end of an exhaust pipe 23 sticks out from the eighth sampling container 15 ((8)) so that it faces one end of a pipe 18 for introducing the rainfall into an overflow container 17 on the bed plate 8 (refer to FIG. 6). Thus, when the quantity of rainfall sampled in the eighth sampling container 15 ((8)) exceeds the appointed value, the rainfall is overflows to be collected in a beaker 17 on the bed plate 8, whereby the whole residual rainfall can be sampled separately from the first stage rainfall. In addition, although the weight 16 serves also as a stop for determining a position where the revolution is completed in this preferred embodiment, the stop for determining the position where the revolution is completed may be provided separately from the weight 16.

As above described, an almost equal quantity of rainfall can be sampled in a separate step by step procedure in the first to seventh sampling containers 15, respectively. If the sampling operation is over, the disks 12, 12 are taken out of tile housing 2 together with the bed plate 8 and the respective sampling containers 15 are removed from the disks 12, 12 so as to be used for other uses such as measurements of pH-value and electric conductivity. In addition, the sampling containers 15 are simple in construction, so that they are easily washed.

Such the sampler can be formed lightweight and compact by using transparent acrylic resins and the like for almost all main members, so that it can be easily installed wherever desired and handled even by a beginner. Furthermore, it can be inexpensively provided, so that it is expected that it can be used in many fields.

In a more detailed description, a pair of disks 12, 12 are integrally engaged with each other at a central portion 20 thereof (refer to FIG. 3) and a metallic support shaft 14 fixedly passes through the central portion 20 so to pivot on resinous bearing members 22, 22 called a roulon put on upper portions of the support plates 11, 11 standing on the bed plate 8 with a reduced friction factor, whereby a subtle balanced condition can be formed. However, such a consideration is not always specifically required in the case where the whole weight is reduced by for example using merely one disk 12, as disclosed in a preferred embodiment which will be mentioned later.

Figure 4:
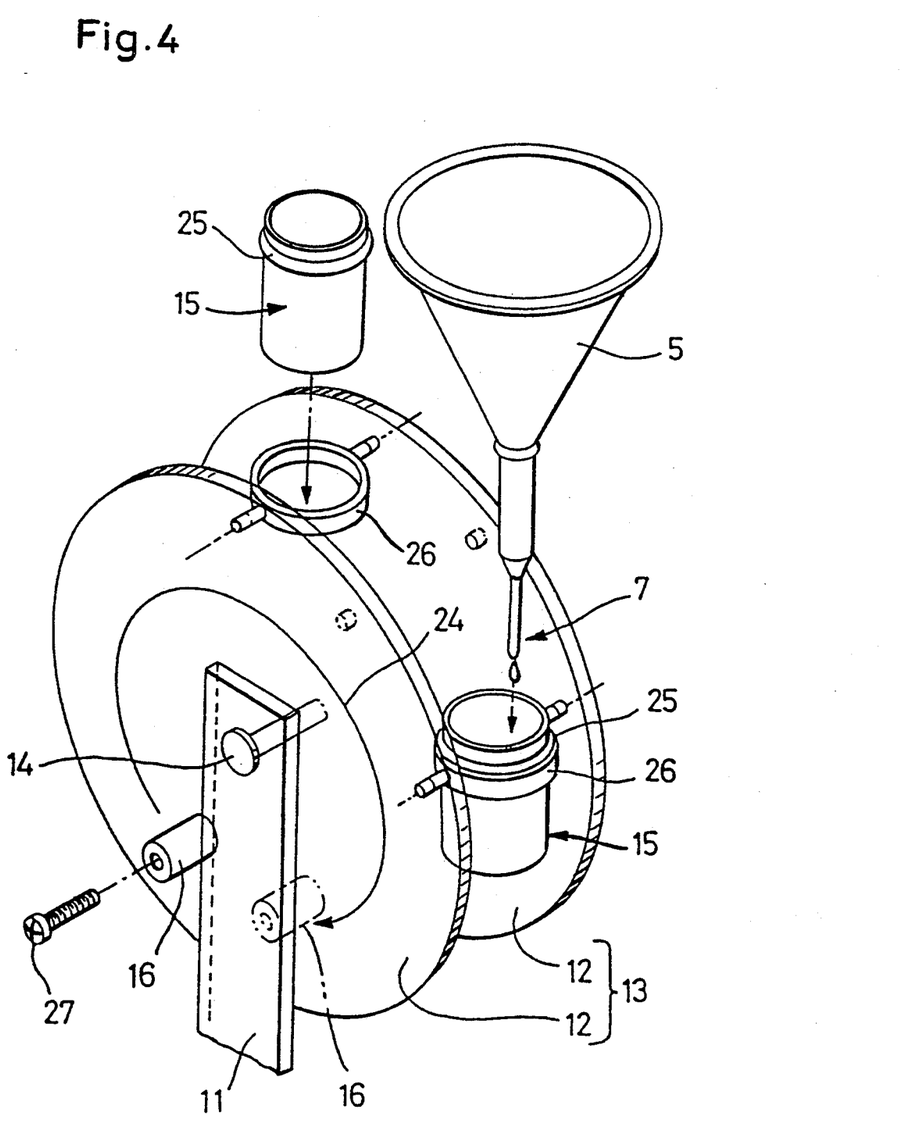
FIG. 4 is an exploded perspective view showing essential parts in the first stage rainfall sampler.

The sampling containers 15 for sampling the rainfall are in the form of bottomed cylinder simple in construction and are hung down between both disks 12, 12 so as to be swingable within a plane parallel to both disks 12, 12 and detachable by engaging a circumferential projected member 25 formed on an upper outer circumference thereof with a circular receiving member 26 pivoted between both disks 12, 12 (refer to FIG. 4). In short, the sampling containers 15 can be put on the receiving member 26 from the upper part to be simply installed and always held in an almost vertical posture under the condition that they are hung down by means of the receiving member 26 (refer to FIG. 3). Accordingly, when the sampling containers 15 are to be removed, it is sufficient to remove them as they are. They have a remarkably handy construction. Furthermore, although the sampling containers 15 on the market are used in this preferred embodiment, sampling containers having cut ends on both sides and sampling containers with an expanded mouth so as to smoothly sample from one to the following one, as disclosed in the preferred embodiments which will be mentioned later, also can be used.

The weight 16 for balancing between the sampled rainfall and the disks 12, 12 is in the form of a cylinder and fixedly screwed onto an outer side of one disk 12 by means of a bolt 24 (refer to FIG. 4) and it is engaged with one side of the support plate 11 to be balanced under the first stage condition before the rainfall is sampled, as shown by a broken line in FIG. 1 and a full line in FIG. 4, and, at this time, the first sampling container 15 (①) corresponds to a position immediately below the outlet port 7 of the funnel 5. When the weight 16 is revolved in the direction separating from one side of the support plate 11 to be engaged with the other side of the support plate 11, the disks 12, 12 are stopped, and, at this time, the eighth sampling container 15 (⑧) corresponds to the position immediately below the outlet port 7 to complete the sampling operation (refer to FIG. 6). In short, the weight 16 functions as a stop and not only variably forms a balanced condition between it and the rainfall sampled by changing its position by a revolution of the disks 12, 12 to automatically achieve the sampling operation but also sets a first stage position and a final position of the sampling container 15. In addition, as above described, also a stop for setting the first stage position of the sampling container 15 and a stop for setting the final position of the sampling container 15 may be provided separately from the weight 16.

Figure 5:
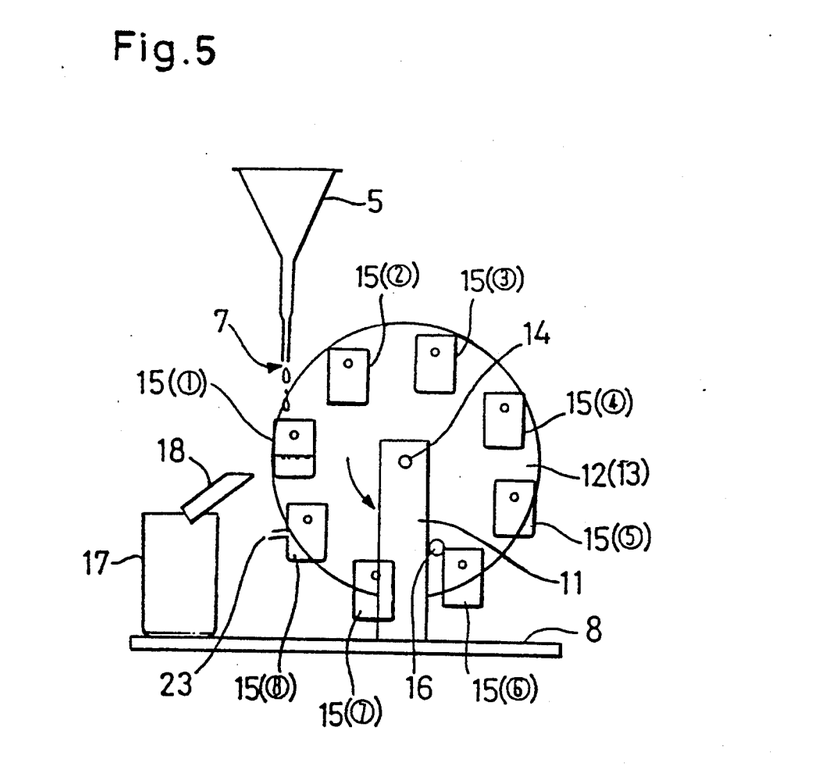
FIG. 5 is an operation diagram showing a first stage condition of the first stage rainfall sampler.
Figure 6:
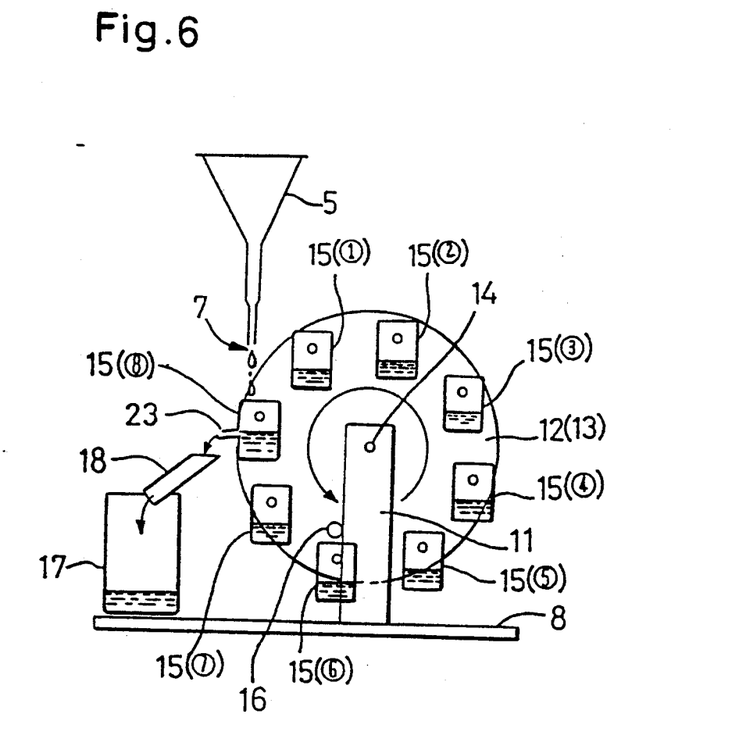
FIG. 6 is an operation diagram showing a final stage of the first stage rainfall sampler.

This process of variable forming the balanced condition by the weight 16 will be explained below with reference to FIGS. 5, 6. At first, under the first stage condition, the weight 16 is engaged with one side surface of the support plate 11 under the condition that the disks 12, 12 are energized clockwise by a weight of the weight 16.

As the rainfall is poured drop by drop into the first sampling container 15 (①) from the funnel 5 to be sampled, the disks 12, 12 are revolved counterclockwise little by little to be balanced with the weight 16, of which horizontal torque arm from the support shaft 14 has been increased in length, whereby the second sampling container 15 (②) corresponds to the position immediately below the outlet port 7 of the funnel 5. Subsequently, the horizontal arm for the support shaft 14 of the weight 16 is similarly increased in length for the sampled rainfall to form the balanced condition until a time when the rainfall is sampled in the third sampling container is (③).

When the rainfall begins to pour into a fourth sampling container 15 (④), the first container 15 (①) is positioned on the right side of the support shaft 14, so that the rainfall within the first sampling container 15 (①) and the weight 16 are balanced by the rainfall in the three sampling containers 15 (④, ③, ②).

In a stage of sampling the rainfall in a fifth sampling container 15 (⑤), the weight 16 is positioned on the left side of the support shaft 14, so that the weight 16 and the rainfall in the three sampling containers 15 (⑤, ④, ②) are balanced by the rainfall in the two sampling containers 15 (①, ②). Subsequently, the balanced condition is similarly formed variably between the weight 16 and the sampled rainfall on the right and left sides of the support shaft 14 until the eighth sampling container 15 (③) (refer to FIG. 6) to automatically continue the sampling operation.

If the present sampler was used to sample the rainfall, 3.4, 3.3, 3.5, 3.3, 3.5, 3.5 and 3.3 ml of rainfall could be sampled in the first to seventh sampling container 15, respectively.

In addition, a quantity (ml) of rainfall to be sampled as the rainfall fraction of 1 mm is determined by a diameter of the funnel 5 and a quantity of rainfall to be sampled is determined by the weight of the weight member 16, so that the first stage rainfall is more finely sampled in the case where the diameter of the funnel 5 is larger but the weight of the weight 16 is smaller as compared with the case where the diameter of the funnel 5 is smaller but the weight of the weight 16 is larger. In addition, in order to increase the quantity of rainfall to be sampled at the same sampling widths, it is sufficient to increase the diameter of the funnel 5 and the weight of the weight 16.

Figure 7:
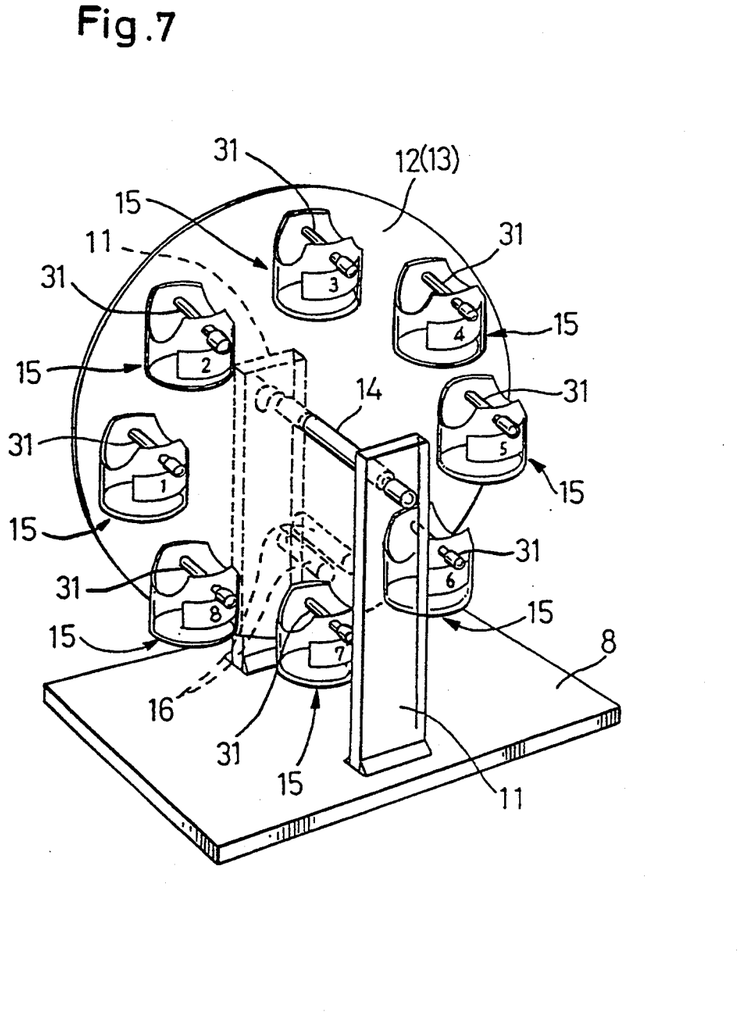
FIG. 7 is a perspective view showing essential parts in the first stage rainfall sampler according to another preferred embodiment.
Figure 8:
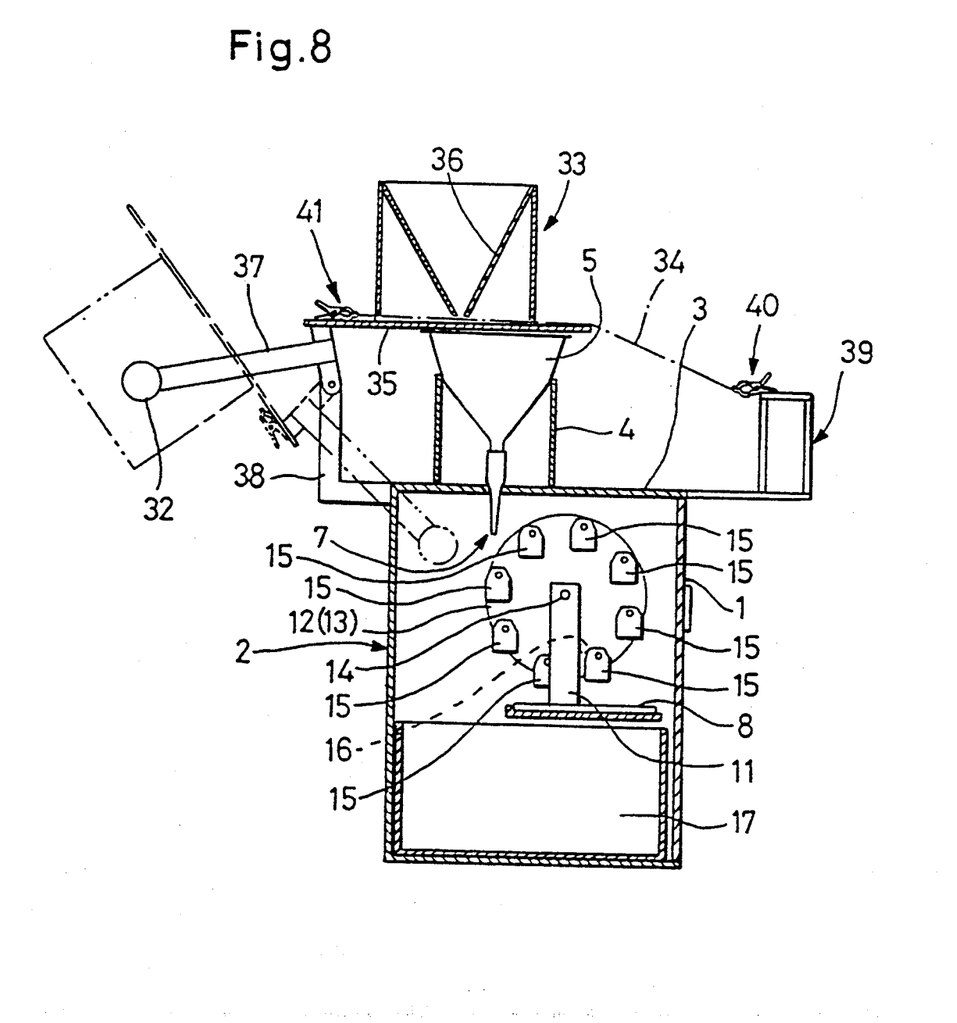
FIG. 8 is a side view showing the first stage rainfall sampler.

FIGS. 7, 8 show another preferred embodiment in which the sampler is still more simplified in construction and a cover for preventing dry segments and the like from sticking to the funnel can be automatically opened without requiring a motive power. The tumbler 13 hanging down the respective sampling containers 15 therefrom is made from a piece of disk 12, support shafts 31 being fixed at regular intervals on the same circumference of the disk 12, the respective support shafts 31 being inserted into shaft holes formed in an upper part of the sampling container 15 (Refer to FIG. 7). A cover 33, which is opened by a weight 32, is provided in an upper part of a housing 2, and the cover 33 is placed on a funnel 5 by a tension of a tissue paper 34 such as of the type used as toilet paper so that the tissue paper 34 may be broken when it rains to permit the cover 33 to fall down and thus open an upper part of the funnel 5 (refer to FIG. 8). In addition, two pieces of weight 16 are mounted on the disk 12 so that the respective weights 16 may separately serve also as a stop for setting the first stage position and a stop for setting the final position.

The above described cover 33 comprises a flat plate 35 and a funnel-shaped raindrop-collector 36 mounted on the flat plate 35, the flat plate 35 being provided with a support member 37 extending outward and fixedly mounted in a lower part of one end thereof. The support member 37 is provided with the weight 32 mounted on a pointed end thereof, and the support member 37 is pivoted on an upper end of a L letter-shaped support member 38 bent from one upper end of the housing 2 and extended upward from a base thereof. A support member 39 extending outward is mounted on the other upper end of the housing 2 so that the cover 33 may close the funnel 5, as shown by a full line, by the tension of the tissue paper 34 extended over a clip 40 fixedly mounted on the support member 39 and a clip 41 fixedly mounted on one end of the flat plate 35. The tissue paper 34 is extended immediately below the raindrop-collector 36 on the flat paper 35, so that, when it rains, the tissue paper 34 is broken soon, whereby the cover 33 immediately falls down due to the weight of the weight member 32 at a position shown by a two-dot chain line to open the funnel 5.

In addition, in this preferred embodiment, the pipe 18 and the exhaust pipe 23 shown in FIG. 1 are not used and the rainfall overflowing from the eighth sampling container 15 ((8)) is directed to fall drop by drop into an overflow container 17 arranged in a lower part of the housing 2. Although it is not shown, it is better to hang a thread from an outside notched portion of the eighth sampling container 15 ((8)) or mount a thread-like member made of paper, plastic or the like there in order to allow the rain to smoothly fall drop by drop.

Furthermore, in both preferred embodiments shown in FIGS. 1, 8, it is important to fix the position of the outlet port 7 of the funnel 5. It is preferable to stick double-sided tape or the like are stuck to for example, between the funnel hole 6 and the funnel 5 in the ceiling portion 3 of the housing 2 to fix the position of the outlet port 7 of the funnel 5.

As above described, with the first stage rainfall sampler according to the present invention, a variable balanced condition is formed between the rainfall sampled by the sampling containers detachably mounted on the tumbler and the weight mounted on the tumbler, so that the rainfall can be automatically sampled step by step without requiring a motive power and the sampling containers can be easily washed. In addition, the sampler is simple in construction, so that it can be inexpensively produced.

The present invention is not limited by a tumbler detachably hanging the sampling containers as disclosed in the preferred embodiments. The tumbler may be formed of a support member radially extending from a support shaft or a circular member may be supported by a support shaft through a rib.

In addition, the detachable supporting construction of the sampling containers is not limited by the preferred embodiments. A circular receiving member may be partially notched.

What is claimed is:

1. A rainfall sampler comprising:
   a housing member including means for receiving rainfall and permitting it to flow by gravity through an outlet port;
   a support member vertically mounted adjacent the receiving means for receiving the rainfall, the support member being rotatably mounted to allow rotation in a vertical plane about a central pivot point and including a plurality of separate containers that are sequentially positioned beneath the outlet port by rotation in a vertical plane; and
   a weight member attached to the support member to balance the weight of rainfall that is held in a container so that the individual containers will progressively rotate in a vertical plane moved solely by a difference in weight between the weight member and the container as they are filled from the outlet port, the weight member providing a varying torque force to the support member relative to its movement with the support member around the central pivot point.

2. The invention of claim 1 wherein each container is pivotally mounted to the support member.

3. The invention of claim 1, further including a stop member positioned adjacent the support member for providing a limit to the rotation of the support member.

4. The invention of claim 1 wherein one container has an overflow port.

5. The invention of claim 1 wherein the support member includes a series of pivoting receiving members for respectively providing a removable support for each container.

6. The invention of claim 3 wherein the weight member projects outward from a side surface of the support member to contact the stop member at the beginning and end of rotational movement.

7. The invention of claim 5 wherein each container has a pair of arcuate edges.

8. The invention of claim 1, further including a pivotally-mounted cover that is balanced to cover the receiving means and is activated by rainfall to open the receiving means.

9. A rainfall sampler capable of sequentially storing predetermined quantities of rainfall in separate containers by mechanical operation, comprising:
   a housing member having an opening to receive rainfall and to direct it to an output port within the housing member;
   mechanical means for covering the housing member opening with a cover member and removing the cover member when rainfall occurs, including a pivotally-mounted cover member that is biased to an open position and a restraining member that holds the cover member in a closed position over the housing member opening, the restraining member releasing the cover member in the presence of rainfall, wherein the restraining member is a paper member which loses its strength when sufficiently wetted; and
   means in the housing member for allowing a support member and attached separate containers to revolve ferris wheel-like in a vertical plane for respectively and sequentially storing a predetermined weight of rainfall in separate containers.

10. The invention of claim 9 wherein the mechanical means includes a pivotally-mounted cover member that is biased to an open position and a restraining member that holds the cover member in a closed position over the housing member opening, the restraining member releasing the cover member in the presence of rainfall.

11. The invention of claim 9 wherein the paper member is a segment of toilet paper-like material that is tautly secured to hold the cover member in a closed position when dry.

12. The invention of claim 9 further including a removable weight member which balances the support member to permit rotation after receiving a predetermined weight of rainfall.

13. The invention of claim 11 wherein the cover member includes a cantilevered arm with a weight member to bias the cover member to an open position.

14. A rainfalls sampler comprising:
   a housing member including a funnel means for receiving rainfall and permitting it to flow by gravity through an outlet port;
   a ferris wheel-like support member rotatably mounted adjacent the funnel means for receiving the rainfall, including a plurality of removable separate containers that are pivotally mounted on the support member and are sequentially positioned beneath the outlet port by rotation of the support member in a vertical plane about a pivot point; and
   a weight member directly attached to the support member to balance the weight of rainfall that is held in a container so that the individual containers will progressively rotate due to a difference in weight between the containers and the weight member as the containers are filled from the outlet port as the weight member rotates from one side of the pivot point to the other side of the pivot point, the weight member with the individual containers empty initially exerting a torque force in a first direction about the pivot point and, when the containers are filled with rainfall, the weight member will exert a torque force in a second direction about the pivot point, the first and second directions being opposite to each other.

* * * * *